United States Patent
Itami et al.

(10) Patent No.: US 9,864,164 B2
(45) Date of Patent: Jan. 9, 2018

(54) OPTICAL DEFLECTOR, METHOD FOR MIRROR FINISHING OF MIRROR BY CUTTING, AND LIGHT DETECTION AND RANGING DEVICE

(71) Applicants: Yukio Itami, Shizuoka (JP); Shigeaki Imai, Kanagawa (JP); Tadashi Nakamura, Kanagawa (JP)

(72) Inventors: Yukio Itami, Shizuoka (JP); Shigeaki Imai, Kanagawa (JP); Tadashi Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/368,959

(22) Filed: Dec. 5, 2016

(65) Prior Publication Data

US 2017/0168261 A1 Jun. 15, 2017

(30) Foreign Application Priority Data

Dec. 10, 2015 (JP) ................. 2015-241259

(51) Int. Cl.
| | |
|---|---|
| *G02B 26/08* | (2006.01) |
| *G02B 7/182* | (2006.01) |
| *G02B 26/10* | (2006.01) |
| *G01S 7/481* | (2006.01) |

(52) U.S. Cl.
CPC .......... *G02B 7/1821* (2013.01); *G01S 7/4817* (2013.01); *G02B 26/105* (2013.01)

(58) Field of Classification Search
USPC .......... 359/199.1, 200.1, 200.2, 201.1, 201.2
See application file for complete search history.

(56) References Cited

U.S. PATENT DOCUMENTS

| | | | |
|---|---|---|---|
| 5,069,515 A | 12/1991 | Itami et al. | |
| 5,726,699 A | 3/1998 | Itami et al. | |
| 5,739,602 A | 4/1998 | Suzuki et al. | |
| 9,632,309 B2* | 4/2017 | Yasuda | ................ G02B 26/085 |
| 2002/0118429 A1* | 8/2002 | Miyajima | ............ G02B 26/085 |
| | | | 359/199.1 |
| 2004/0070816 A1* | 4/2004 | Kato | .................... G02B 26/085 |
| | | | 359/291 |
| 2004/0165240 A1 | 8/2004 | Suzuki et al. | |
| 2004/0240000 A1 | 12/2004 | Miyatake et al. | |

(Continued)

FOREIGN PATENT DOCUMENTS

| | | |
|---|---|---|
| JP | 2001-228432 | 6/2001 |
| JP | 2006-293235 | 10/2006 |

(Continued)

OTHER PUBLICATIONS

U.S. Appl. No. 15/0188,028 filed Jun. 21, 2016.

*Primary Examiner* — Mohammed Hasan
(74) *Attorney, Agent, or Firm* — Oblon, McClelland, Maier & Neustadt, L.L.P.

(57) ABSTRACT

An optical deflector includes a mirror rotatable around a rotating shaft of the optical deflector, the mirror including a base made of metal and a reflective surface, the reflective surface being parallel to an axial direction of the rotating shaft of the mirror. The mirror has a length that is twice a length from a center of the rotating shaft to the reflective surface, which is shorter than a length of the reflective surface in the direction of the rotating shaft.

9 Claims, 12 Drawing Sheets

(56) References Cited

U.S. PATENT DOCUMENTS

| | | |
|---|---|---|
| 2005/0094234 A1 | 5/2005 | Miyatake et al. |
| 2006/0061847 A1 | 3/2006 | Itami |
| 2006/0209377 A1 | 9/2006 | Atsuumi et al. |
| 2007/0058255 A1 | 3/2007 | Imai et al. |
| 2007/0146849 A1 | 6/2007 | Miyatake et al. |
| 2007/0146852 A1 | 6/2007 | Itami |
| 2007/0153349 A1 | 7/2007 | Itami et al. |
| 2008/0055690 A1 | 3/2008 | Nakamura et al. |
| 2008/0068678 A1 | 3/2008 | Suzuki et al. |
| 2008/0170283 A1 | 7/2008 | Imai |
| 2008/0174843 A1 | 7/2008 | Masuda et al. |
| 2008/0192323 A1 | 8/2008 | Nakamura et al. |
| 2008/0204841 A1 | 8/2008 | Suzuki et al. |
| 2008/0218829 A1 | 9/2008 | Nakamura |
| 2008/0239432 A1* | 10/2008 | Itami ............... G02B 5/09 359/203.1 |
| 2009/0015897 A1 | 1/2009 | Nakamura et al. |
| 2009/0058979 A1 | 3/2009 | Saisho et al. |
| 2009/0073523 A1 | 3/2009 | Nakamura |
| 2009/0074437 A1 | 3/2009 | Tanabe et al. |
| 2009/0074459 A1 | 3/2009 | Nakamura et al. |
| 2009/0201358 A1 | 8/2009 | Nakamura |
| 2009/0225385 A1 | 9/2009 | Imai |
| 2009/0231654 A1 | 9/2009 | Imai |
| 2009/0231659 A1 | 9/2009 | Masuda et al. |
| 2010/0091083 A1 | 4/2010 | Itami et al. |
| 2010/0091342 A1 | 4/2010 | Nakamura |
| 2011/0058230 A1 | 3/2011 | Soeda et al. |
| 2012/0056968 A1 | 3/2012 | Imai et al. |
| 2012/0177409 A1 | 7/2012 | Arai et al. |
| 2012/0182367 A1 | 7/2012 | Masuda et al. |
| 2012/0236380 A1 | 9/2012 | Miyatake et al. |
| 2013/0016171 A1 | 1/2013 | Nakamura et al. |
| 2013/0083148 A1 | 4/2013 | Miyatake et al. |
| 2013/0188992 A1 | 7/2013 | Itami |
| 2013/0201536 A1 | 8/2013 | Nakamura et al. |
| 2013/0229645 A1 | 9/2013 | Suzuki et al. |
| 2013/0235143 A1 | 9/2013 | Itami et al. |
| 2013/0235144 A1 | 9/2013 | Miyake et al. |
| 2014/0009555 A1 | 1/2014 | Itami et al. |
| 2014/0204166 A1 | 7/2014 | Itami et al. |
| 2014/0218456 A1 | 8/2014 | Itami |
| 2015/0016845 A1 | 1/2015 | Itami |
| 2015/0097910 A1 | 4/2015 | Itami et al. |
| 2015/0261120 A1 | 9/2015 | Fujii et al. |
| 2015/0268462 A1 | 9/2015 | Itami et al. |
| 2015/0316871 A1 | 11/2015 | Itami |
| 2016/0116732 A1* | 4/2016 | Yasuda ............... G02B 26/085 359/200.7 |
| 2016/0147060 A1 | 5/2016 | Itami et al. |

FOREIGN PATENT DOCUMENTS

| | | |
|---|---|---|
| JP | 2013-170962 | 9/2013 |
| JP | 2013-546009 | 12/2013 |
| WO | WO2012/045603 A1 | 4/2012 |

\* cited by examiner (a-1)

(b-1)

(a-2)

(b-2)

OPTICAL DEFLECTOR, METHOD FOR MIRROR FINISHING OF MIRROR BY CUTTING, AND LIGHT DETECTION AND RANGING DEVICE

CROSS-REFERENCE TO RELATED APPLICATIONS

This patent application is based on and claims priority pursuant to 35 U.S.C. §119(a) to Japanese Patent Application No. 2015-241259, filed on Dec. 10, 2015, in the Japan Patent Office, the entire disclosure of which is hereby incorporated by reference herein.

BACKGROUND

Technical Field

The present invention relates to an optical deflector including a mirror, a method for mirror finishing of a mirror by cutting, and a Light Detection and Ranging (LiDAR) device including the optical deflector.

Description of the Related Art

A conventional Light Detection and Ranging (LiDAR) device determines the distance to an object by irradiating the object with light emitted from a light source, and receiving the light reflected back from the object on a light receiver via a mirror unit. The LiDAR device determines the distance to the object based on the time of flight of the light that is emitted from the light source, reflected back from the object, and received by the light receiver (the time lag between the light emission and the light reception), and speed of light in an optical-pulse time-of-flight method.

A conventional optical deflector for a LiDAR device includes a reflector (such as a mirror) secured to a separate rotatable member. The reflector is generally a so-called glass reflector made of a glass member coated with a layer of metal deposition.

When securing a glass reflector in an optical deflector, it is difficult to firmly secure the reflector to a rotatable member with a great securing force while keeping the flatness of the mirror surface. These two objects are generally in the relationship of trade-off. If the reflector is firmly secured to the rotatable member to ensure good securing, the mirror surface will be deformed. If the reflector is not firmly secured to the rotatable member to keep the flatness of the mirror surface, the reflector may be loosened by the vibration and impact given from the outside. In the latter case, such a structure cannot ensure the reliability of the LiDAR device including the optical deflector against the vibration and impact from the outside when the LiDAR device is used as a vehicle component. In either case, the structure for mounting a glass reflector on a rotatable member has one of the disadvantages.

SUMMARY

Example embodiments of the present invention include an optical deflector, which includes a mirror rotatable around a rotating shaft of the optical deflector, the mirror including a base made of metal and a reflective surface, the reflective surface being parallel to an axial direction of the rotating shaft of the mirror. The mirror has a length that is twice a length from a center of the rotating shaft to the reflective surface, which is shorter than a length of the reflective surface in the direction of the rotating shaft.

Example embodiments of the present invention include a method for mirror finishing by cutting of the mirror for the above-described optical deflector, which includes applying mirror finishing by cutting on the reflective surface of the mirror, while holding the mirror with the first member and second member, the first member and the second member respectively being pressed against the reference surface and the contact surface.

Example embodiments of the present invention include a LiDAR device including the above-described optical deflector.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1A:
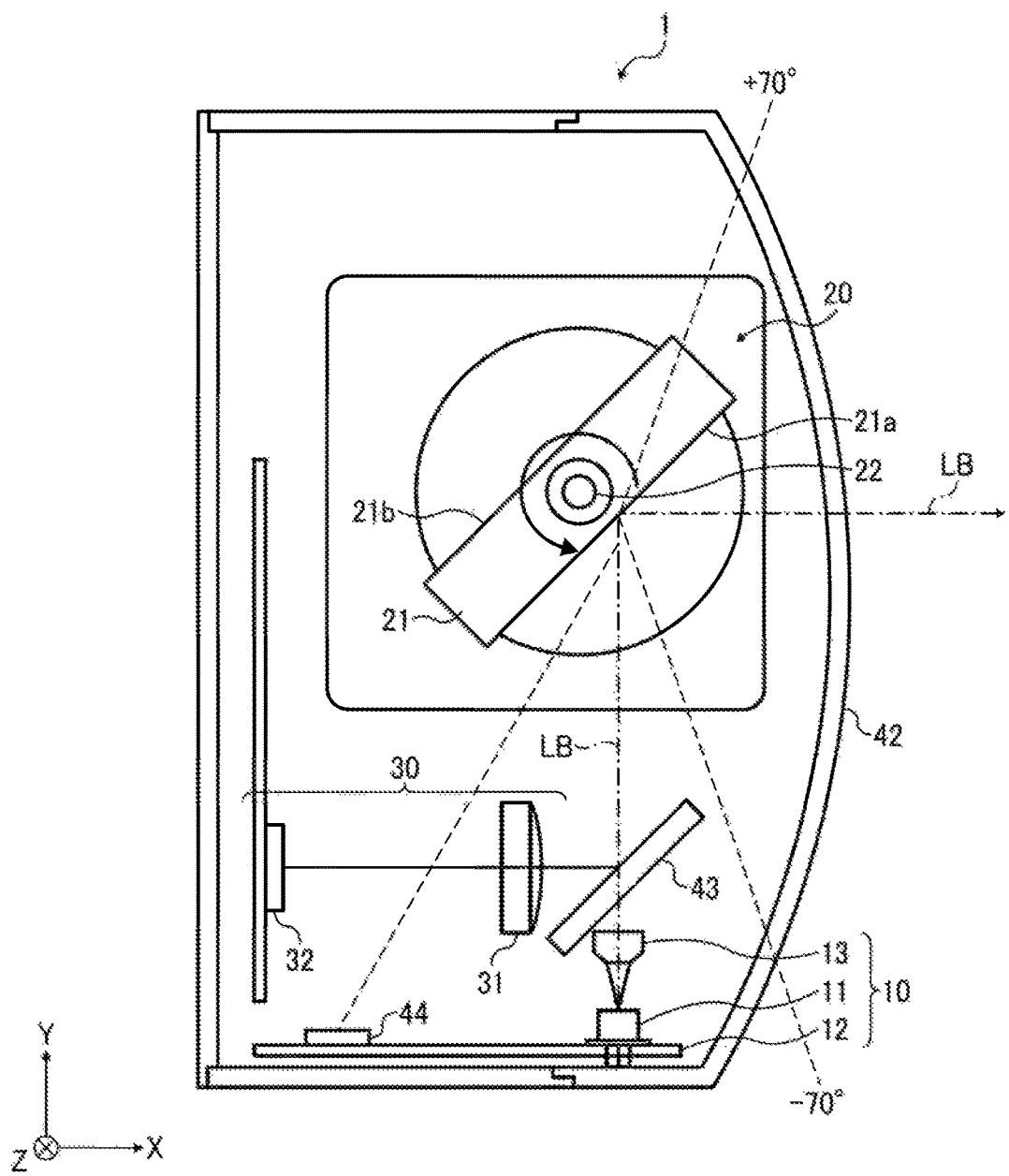
FIG. 1A is a plan view illustrating a LiDAR device including an optical deflector according to a first embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

The embodiments of the present invention will be described in detail below referring to the accompanying drawings.

Figure 1B:
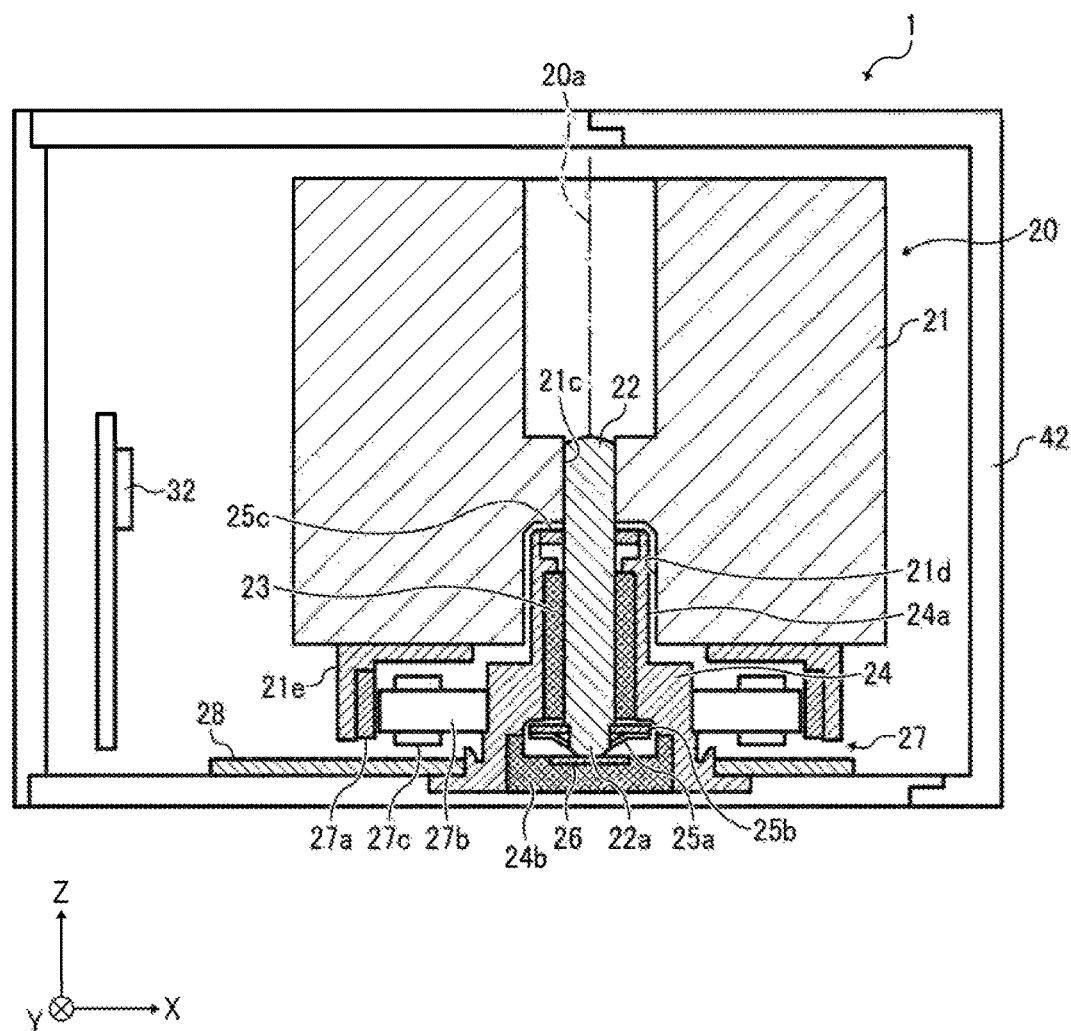
FIG. 1B is a vertical cross-sectional view illustrating a part of the LiDAR device.

FIG. 1A is a plan view illustrating a LiDAR device including an optical deflector according to a first embodiment of the present invention without the top, and FIG. 1B is a vertical cross-sectional view illustrating a part of LiDAR device.

The LiDAR device, which is mounted in a vehicle, for example, determines the distance between the vehicle and an object or another vehicle in a short time by irradiating the object with light and receiving the light reflected back from the object.

The LiDAR device in the following embodiments may be mounted in a nonmoving object or a moving object other than a vehicle or may be used alone.

Examples of the object include a nonmoving object and a moving object other than a vehicle.

As illustrated in FIGS. 1A and 1B, a LiDAR device 1 includes a light source device 10, an optical deflector 20, a light receiver 30, a measuring processor, and a cover 42 covering these components.

FIGS. 1A and 1B illustrate a XYZ three-dimensional orthogonal-coordinate system having the Z-axis orthogonal to the direction of movement of the vehicle in which the distance measuring equipment is mounted.

FIG. 1A is a plan view illustrating the inside of the housing, and FIG. 1B is a cross-sectional view taken in the plane that includes the rotation of the optical deflector 20 and is parallel to the X-axis and Z-axis.

The light source device 10 includes as light source 11, a light-source driving circuit, a circuit board 12 having a circuit for the light receiver, and a coupling lens 13.

The light source 11 is mounted on the circuit board 12 and includes one light emitter or semiconductor laser (edge emitting laser). The light source 11 is disposed such direction of irradiation is parallel to the Y-axis, and emits laser beams LB in the positive direction of the Y-axis.

The light-source driving circuit periodically drives (pulse-drives) the light source 11 to generate optical pulses. The light-emission time of the light source 11 per pulse is approximately in the range of several ns to 100 ns, for example. The light-emission period of the light source 11 is preferably 3 µs or longer.

If the light-emission period is too short, the laser beam emitted toward an object will interfere with the laser beam previously emitted and reflected back from the object, making it difficult to distinguish the signals of one laser beam from those of the other laser beam.

This will be described in detail below.

The distance L to an object can be given by the expression $L=\Delta t \times C/2$, where $\Delta t$ represents the time lag between the time of emission of optical pulse from the light source 11 and the time of detection of the reflected optical pulse, and C represents the speed of light.

For example, when $\Delta t$ is 3 µs, L is 450 m.

A typical distance measuring equipment can detect object within the range of approximately up to 200 m. If the distance measuring equipment receives the light reflected back from an object 450 m away, the intensity which is enough low, the interference of light between two successively emitted optical pulses has little effect on the measurement of distance.

In a typical distance measuring equipment, the light-emission frequency of an optical pulse is set in the range of 10 kHz to 100 kHz, which can be converted into the light-emission period in the range of 10 µs to 100 µs.

If the range of detection is limited to a close area and the optical output is set at an appropriate amount of light, the interference with the light from a distance will not occur, allowing the shortening of the light-emission frequency.

In FIG. 1A, the coupling lens 13 is a plano-convex lens. The coupling lens 13 is disposed on the positive side of the Y-axis with respect to the light source 11, i.e. on the optical path of the laser beams from the light source 11. The coupling lens 13 substantially collimates the dispersed ray bundle from the light source 11 or converts the dispersed ray bundle into a slightly dispersed one.

The optical deflector 20 includes a rotating shaft 22 having the axis parallel to the Z-axis, and is disposed on the positive side of the Y-axis with respect to the light source device 10 in this example. The rotatable body of the optical deflector is driven by a driver including a motor and rotates around the axis at a predetermined rotation speed. The rotatable body or mirror (deflecting mirror, reflector) 21 rotates in the direction of the arrow in FIG. 1A, for example.

The optical deflector 20 includes the mirror 21 with a thin structure. The mirror 21 includes a first reflective surface 21a and a second reflective surface 21b that are opposite surfaces parallel to each other.

Each reflective surface is disposed at a different position around the rotating shaft 22 and is parallel to (not orthogonal to and not intersecting with) the axis of the rotating shaft 22. The second reflective surface 21b is here disposed at the position of 180° turn around the rotating shaft 22 with respect to the first reflective surface 21a.

The reflective surfaces 21a and 21b deflect laser beams by reflecting them.

The laser beams LB emitted from the light source device 10 hit the mirror 21. The mirror 21 reflects the laser beams LB with the first reflective 21a in the direction parallel to the X-axis. The light source device 10 and the mirror 21 are here disposed at the same level with the irradiation sites on an object or another vehicle (such as an automobile), for example.

The rotation of the rotating shaft 22 causes the first and second reflective surfaces 21a and 21b to rotate around the axis of the rotating shaft 22, so that the two different reflective surfaces face the light source device 10 at different timings (alternately).

In this case, the timing when the laser beams LB from the light source device 10 hits the first reflective surface 21a is different from the timing when the laser beams LB from the light source device 10 hits the second reflective surface 21b.

The laser beams LB reflected with the first reflective surface 21a or the second reflective surface 21b pass through the front side (a transparent side) of the cover 42 and travel toward another vehicle.

The laser beams LB are reflected with the first reflective surface 21a or the second reflective surface 21b facing the light source device 10 in a predetermined direction parallel to the XY-plane on the positive side of Z-axis, depending on the position of the reflective surface around the axis of the rotating shaft 22 (the rotation position).

In the case of a dispersed ray bundle, the light reflected by the mirror 21 gradually disperses until the light reaches another vehicle. The length of the irradiation site in the Z-axis direction depends on the distance from the rotating shaft 22 to the irradiation site. The length of the irradiation site in the Z-axis direction increases with the increase in the distance from the rotating shaft 22 to the irradiation site.

After the laser beams hit irradiation sites on the another vehicle and are reflected thereon, part of the laser beams returns back along the optical path in which the laser beams have travelled, while gradually dispersing.

Part of the laser beams that have been deflected by the first reflective surface 21a and then reflected on irradiation sites on the another vehicle thus returns back to the first reflective surface 21a. The light reflected back from the another vehicle is reflected by the first reflective surface 21a again and then reflected by another reflector 43 to be received by the light receiver 30.

In the same way, part of the laser beams that have been deflected by the second reflective surface 21b and then reflected on irradiation sites on the another vehicle returns back to the second reflective surface 21b. The light reflected back from the another vehicle is reflected by the second reflective surface 21b again and then reflected by the reflector 43 to be received by the light receiver 30.

The light receiver 30 includes a condenser lens 31 and a photoreceptor 32. The condenser lens 31 is a plano-convex lens, for example, and is disposed on the optical path for the laser beams reflected from the mirror 21. More particularly, the condenser lens 31 is disposed on the negative side of the X-axis with respect to the reflector 43 (See FIG. 1A).

The photoreceptor 32 is a photodiode, for example, and is disposed on the optical path for the laser beams passed through the condenser lens 31. Since the light reflected from an object is weak, a highly sensitive photodiode, such as an avalanche photodiode, is used.

The photoreceptor 32 should preferably be disposed in the vicinity of the focal point of the condenser lens 31 for reducing the size of the photoreceptor 32.

In this case, when the deflective surface of the first reflective surface 21a faces the light source device 10 with the reflector 43 interposed therebetween, the deflective surface of the first reflective surface 21a also faces the condenser lens 31 with the reflector 43 interposed therebetween. In this configuration, the laser beams deflected by the first reflective surface 21a and then reflected back from irradiation sites hit the first reflective surface 21a again and then the reflector 43, and pass through the condenser lens 31 before entering the photoreceptor 32.

In the same way, when the deflective surface of the second reflective surface 21b faces the light source device 10 with the reflector 43 interposed therebetween the deflective surface of the second reflective surface 21b also faces the condenser lens 31 with the reflector 43 interposed therebetween. In this configuration, the laser beams deflected by the second reflective surface 21b and then reflected back from irradiation sites hit the second reflective surface 21b again and then the reflector 43, and pass through the condenser lens 31 before entering the photoreceptor 32.

Part of the laser beams deflected by the first reflective surface 21a and then reflected back from irradiation sites on another vehicle is received by the photoreceptor 32 after passing through the condenser lens 31. When receiving the laser beams, the photoreceptor 32 feeds light-reception signals S1 to the measuring processor.

In the same way, part of the laser beams deflected by the second reflective surface 21b and then reflected back from irradiation sites on another vehicle is received by the photoreceptor 32 after passing through the condenser lens 31. When receiving the laser beams, the photoreceptor 32 feeds light-reception signals S2 to the measuring processor.

The measuring processor determines the distance to an irradiation site based on the time lag between the timing when the light source 11 emits an optical pulse to the first reflective surface 21a and the timing when the light-reception signals S1 corresponding to the optical pulse are received.

In the same way, the measuring processor determines the distance to an irradiation site based on the time lag between the timing when the light source 11 emits an optical pulse to the second reflective surface 21b and the timing when the light-reception signals S2 corresponding to the optical pulse are received.

A synchronization detector is provided to determine the position of the reflective surface of the first reflective surface 21a or the second reflective surface 21b when the mirror 21 (rotatable body) of the optical deflector rotates at a constant speed.

In FIG. 1A, when light is at an angle of approximately −120° with respect to the X-axis, the ray bundle reflected from the mirror 21 enters a synchronization detecting element or photodiode (PD) 44, resulting in the output of synchronization-detection signals. As illustrated with the dashed lines, the light is emitted in the form of optical pulses at regular intervals within the range of −70° to +70°.

Since the mirror 21 of the optical deflector 20 rotates at a constant rate of rotation and at a constant speed, the distance measuring equipment obtains the time-series measurement data as the object-detection data corresponding to the light-emission angle by emitting optical pulses at predetermined intervals within the range of −70° to +70° while referring to the synchronization-detection signals fed at an angle of −120°.

The rotation rate of the optical deflector is constant and in the range of several hundreds rpm to several thousands rpm.

The interval of emission of laser beams varies depending on the rotation rate or the light-emission angle resolution of the optical deflector.

The light-emission interval decreases with the increase in the rotation rate or the light-emission angle resolution of the optical deflector.

For example, when the rotation rate of the optical deflector is 500 rpm and the light-emission emission angle resolution of the optical deflector is 1°, the light-emission interval is 333 μsec and the light-emission frequency is 3 kHz. The distance measuring equipment obtains 141 pieces of data per 1° by emitting light at intervals of 333 μsec and scanning in the range of −70° to +70° as illustrated in FIG. 1A.

For another example, when the rotation rate of the optical deflector is 6000 rpm and the light-emission angle resolution of the optical deflector is 0.25°, the light-emission interval is 6.9 μsec and the light-emission frequency is 144 kHz. The distance measuring equipment can obtain 561 pieces of data per 0.25° by emitting light at intervals of 6.9 μsec and scanning in the range of −70° to +70° as illustrated in FIG. 1A.

The rotation rate and the light-emission angle resolution of the optical deflector can be set as appropriate depending on the application.

Figure 2A:
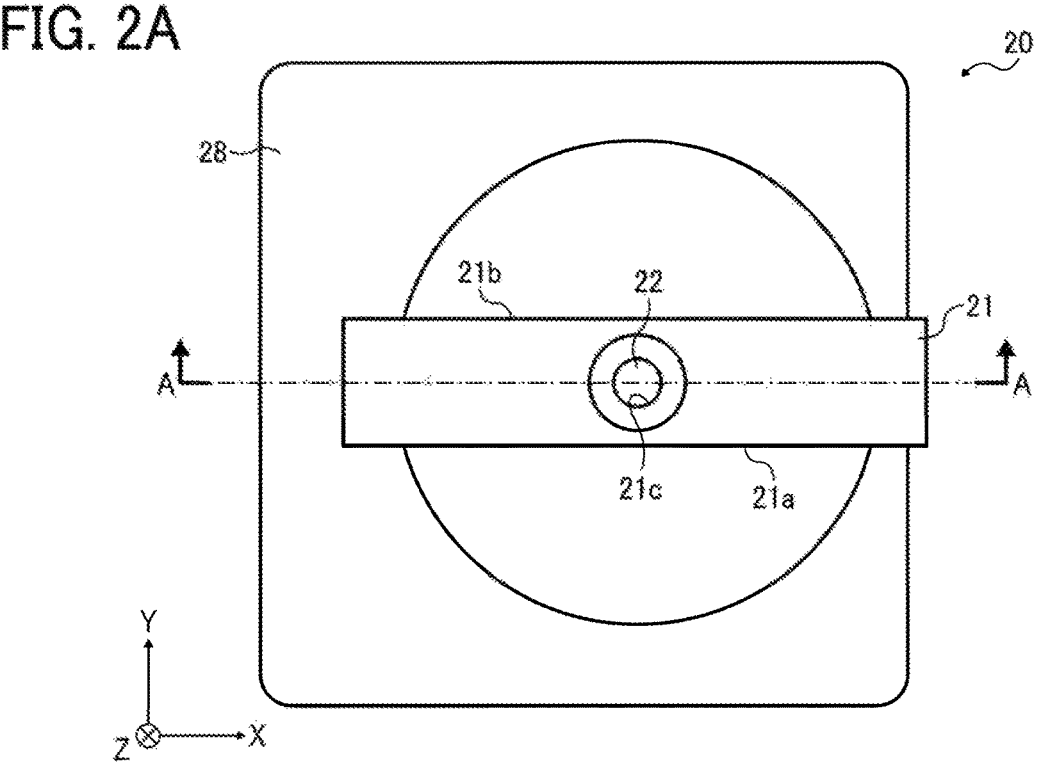
FIG. 2A is a plan view illustrating the optical deflector according to the first embodiment of the present invention.
Figure 2B:
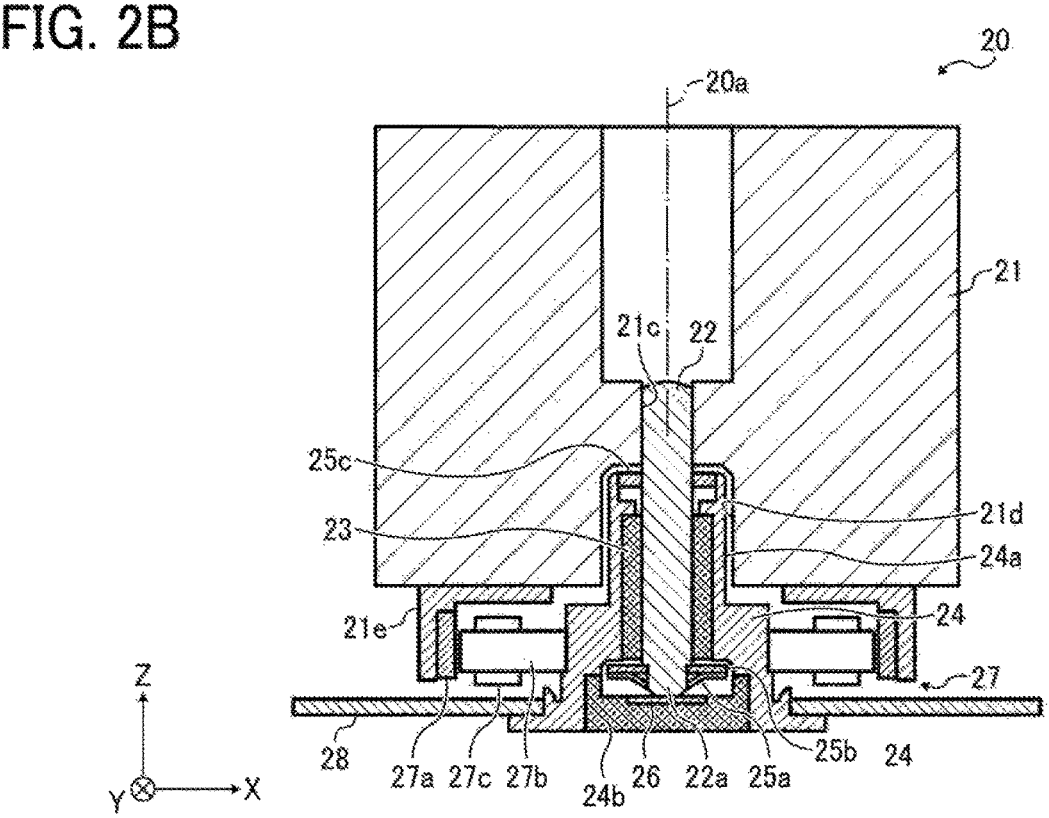
FIG. 2B is a cross-sectional view taken along line A-A of FIG. 2A.

FIG. 2A is a plan view illustrating the optical deflector 20 according to the first embodiment of the present invention, and FIG. 2B is a cross-sectional view taken along line A-A of FIG. 2A. Referring to FIGS. 2A and 2B, the structure of the optical deflector 20 will now be described in detail.

The optical deflector 20 includes the mirror 21 having the first reflective surface 21a on one side and the second reflective surface 21b on the opposite side, the rotating shaft 22 that is integrated with the mirror 21 by shrink fitting in a shaft hole 21c formed at the center of the mirror in the X-axis direction (the longitudinal direction) of the mirror and along the Z-axis direction, a circuit board 28 disposed under the mirror, a housing 24 mechanically held on the circuit board 28 and having a cylindrical projected part 24a in a recess 21d in the lower part of the mirror, a bearing 23 secured to the housing 24 in the cylindrical projected part 24a and rotatably holding the shaft 22 on the inner surface, toppers and 25b and 25b secured to the shaft 22 under the bearing, a seal 25c disposed between the cylindrical projected part of the housing and the shaft 22, a thrust bearing 26 disposed between a subhousing 24b and the lower end of the shaft 22, and a motor 27.

The first and second reflective surfaces 21a and 21b of the mirror 21 are parallel to the rotational central axis 20a. That is, the first and second reflective surfaces 21a and 21b are not to be intersecting with (orthogonal to) the axis.

The mirror 21 is composed of a base material of a metal material such as an aluminum alloy, and includes the first and second reflective surfaces 21a and 21b made by ultra-precision cutting and a transparent protective film on each reflective surface.

The motor 27 includes a plurality of rotor magnets 27a provided to a cylindrical flange 21e secured to the bottom side of the mirror 21, a stator core 27b disposed on the outer surface of the housing 24 facing the rotor magnets, and a plurality of wire-wound coils 27c disposed on the stator core.

The bearing 23 is an oil dynamic-pressure bearing and has a clearance of bearing of 10 μm in diameter. The bearing 23, which may be the radial bearing, may have a dynamic-pressure generating groove to ensure stable rotation. In that case, the dynamic-pressure generating groove can be formed in the outer surface of the rotating shaft 22 or in the inner surface of the bearing 23, however, the groove should preferably be formed in the inner surface of the bearing 23 made of a sintered member, which is easy to process. A preferred material of the rotating shaft 22 is to martensitic stainless steel (such as SUS420J2), which may have a high surface hardness and a high wear resistance due to quenching. The rotor magnets 27a are secured to the inner side surface of the flange 21e and constitute an outer rotor blushless motor together with the stator core 27b (the wire-wound coils 27c) secured to the housing 24. The rotor magnet 27a is a bonded magnet using a resin binder and is held by the flange 21e on its peripheral surface. The thrust bearing 26 is a pivot bearing in contact with the convex surface 22a at the lower end of the rotating shaft 22. The thrust bearing 26 is disposed in the recess in the top surface of the subhousing 24b and uses a resin material for good lubrication.

The bearing 23 and the thrust bearing 26 are disposed in the housing 24 and the subhousing 24b, respectively, and the seal 25c prevents the leakage of oil from these bearings.

The motor of this embodiment is an outer rotor motor, which generates magnetic gap in the radial direction, and arranges the rotor magnets 27a around the peripheral surface of the stator core 27b. The motor is driven and rotated by switching on and off the excitation of the wire-wound coils 27c with a driving IC while referring to positional signals fed from a Hall element mounted on the circuit board 28 in the magnetic field generated by the rotor magnets 27a. The rotor magnets 27a are radially polarized and disposed at several sites in the direction of rotation, and generate rotating torque together with the peripheral surface of the stator core 27b for rotation. Through a harness connected to the circuit board 28, the circuit board 28 is supplied with electricity from the body and feeds or receives the signals for starting or stopping the motor, or controlling the rate of rotation of the motor.

The motor is a 12-pole 9-slot blushless motor including 12 (or 6 pairs of) rotor magnets 27a circumferentially disposed and 9 coils circumferentially disposed on the stator core. The Hall element outputs the position-detection signals for detecting the boundary of NS magnetic poles respective to the twelve poles of the rotor magnets 27a, which are also used as the speed-detection signals for detecting six pulses per rotation. The motor is controlled for rotation at a constant speed in a so-called phase comparison control (phase locked loop (PLL) control) scheme, which compares the phases of the speed-detection signals fed from the Hall element after the waveform shaping with those of the reference clock signals fed from a controller.

<Method for Mirror Finishing of a Mirror by Cutting>

The structure of an apparatus for mirror finishing of a mirror by cutting will now be described.

Figure 3:
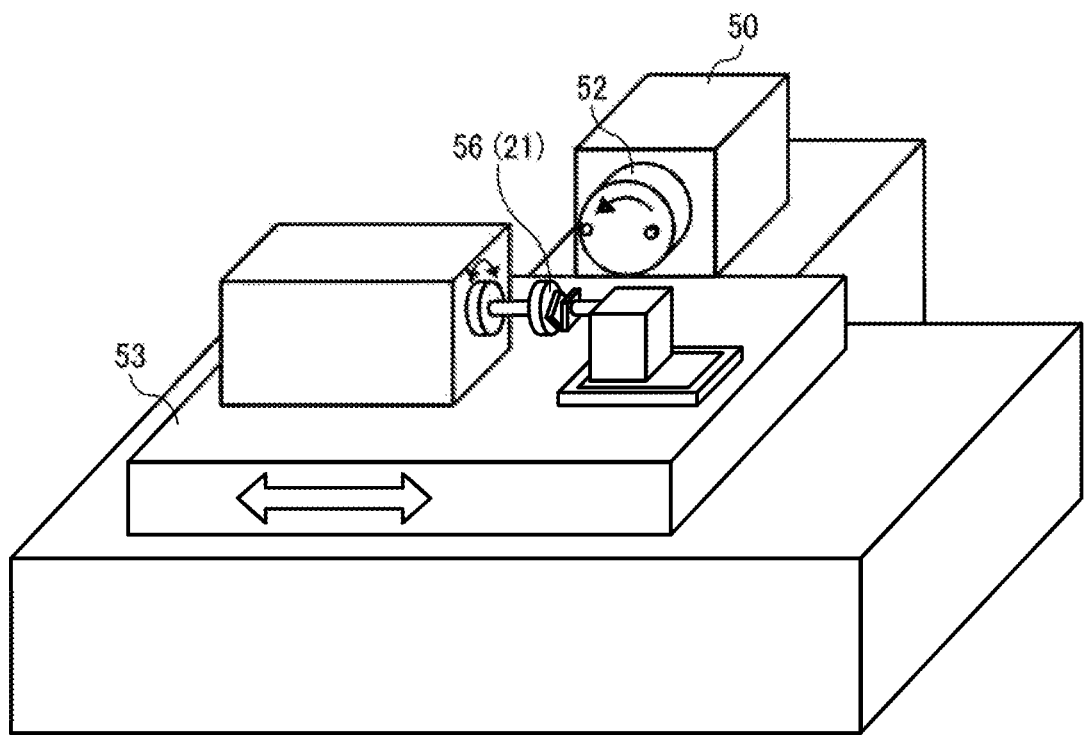
FIG. 3 is an explanatory view illustrating an apparatus for mirror finishing of a mirror.
Figure 4A:
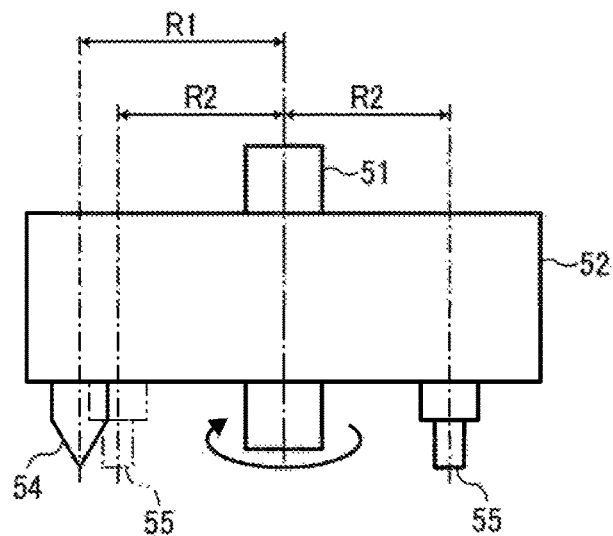
FIG. 4A is a plan view illustrating a cutter holder, and FIG. 4B includes a front view illustrating the cutter holder and a cross-sectional view illustrating a jig.
Figure 4B:
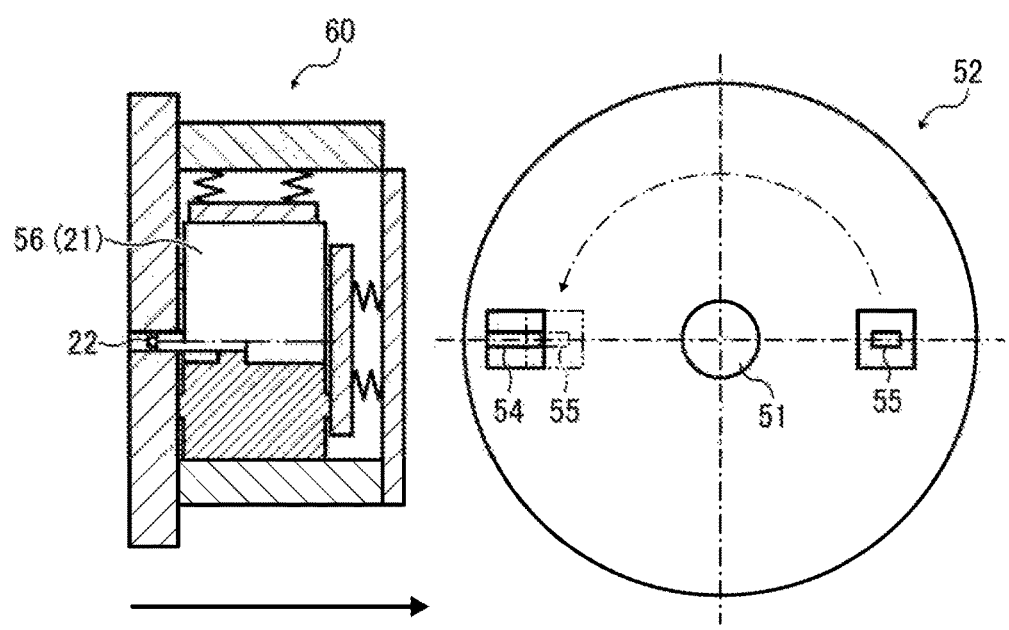
Figure 5A:
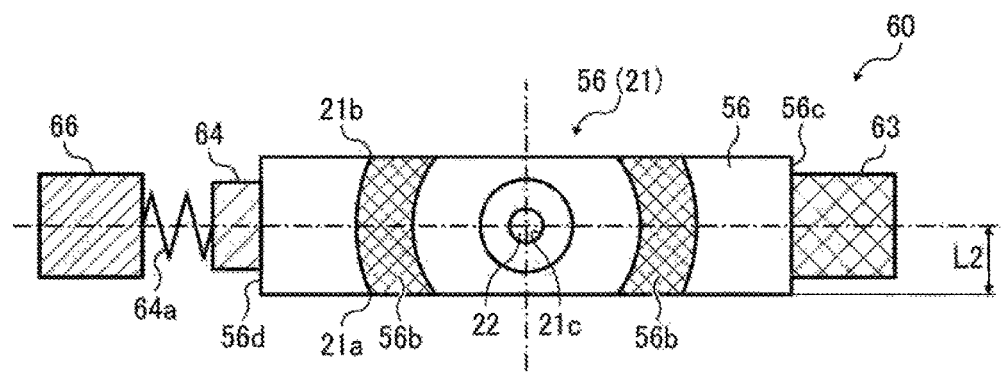
FIG. 5A is a plan view illustrating a part of the jig with a work-piece.
Figure 5B:
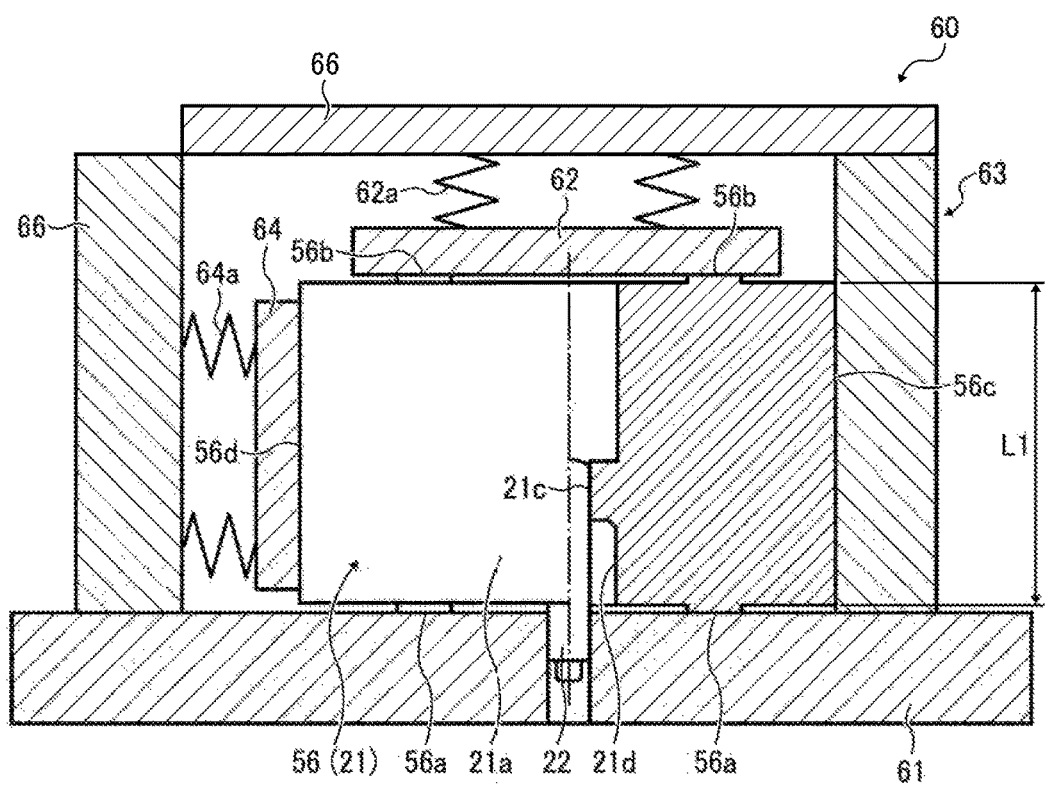
FIG. 5B is a vertical cross-sectional view illustrating the jig holding the workpiece.

FIG. 3 is an explanatory view illustrating an apparatus for mirror finishing of a mirror, FIG. 4A is a plan view illustrating a cutter holder, FIG. 4B includes a front view illustrating the cutter holder and a cross-sectional view illustrating a jig, FIG. 5A is a plan view illustrating a part of jig with a workpiece, and FIG. 5B is a vertical cross-sectional view illustrating the jig holding the workpiece.

As illustrated in FIGS. 3, 4A, and 4B, a spindle 50 holds a cutter holder 52 with a main rotating shaft 51 of the spindle 50 at the center of the cutter holder 52. In front of the spindle 50, there is a stage 53 that moves in the direction orthogonal to the main rotating shaft 51. The stage 53 carrying the mirror 21 moves from right to left in FIG. 3 while the cutter holder 52 rotates due to the rotation of the main rotating shaft 51 of the spindle 50, thereby performing the process of mirror finishing by cutting on a reflective surface of the mirror 21.

Referring to FIGS. 4A and 4B, the cutter holder 52 will now be described in detail. The cutter holder 52 holds a cutting tool 54 for rough machining and a cutting tool 55 for finishing at different distances from the center of rotation on the front surface. As the mirror 21 held by a jig 60 on the stage 53 moves while the cutter holder 52 is rotating, one reflective surface of the mirror is cut by several tens μm by the cutting tool 54 for rough machining disposed at a distance R1 from the center of rotation and then cut by several μm by the cutting tool 55 for finishing disposed at a distance R2 (R1>R2) from the center of rotation to become a mirror-finished surface.

The jig 60 is secured to an automatic angle division board and can be turned by a desired angle around the rotation axis parallel to the direction of movement of the stage. After the first reflective surface is processed in FIG. 4B, the jig 60 is turned around by making a 180° turn of a movable part of the automatic angle division board to face the second reflective surface toward the cutter holder 52 for processing, thereby processing the both sides of the mirror.

Referring to FIGS. 5A and 5B, the jig 60 holding a workpiece 56 (the mirror 21, in this example) will now be described in detail. FIG. 5B illustrates the jig 60 that has been turned up counterclockwise by 90° from the jig 60 illustrated in FIG. 4B.

The work-piece 56 or mirror 21 is a thin mirror having the length that is twice a length L2 from the center of the rotating shaft 22 to one of the reflective surfaces, which is shorter than a length L1 of the reflective surfaces 21a and 21b in the direction of the rotating shaft 22. As described above referring to FIGS. 2A and 2B, the rotating shaft 22 is shrink fitted to the mirror 21 in the shaft hole 21c.

As known, shrink fitting is a scheme in which two components are coupled by heating one component with a shaft hole to expand the inside diameter of the shaft hole, inserting a rotating shaft of the other component in the expanded shaft hole, and cooling the two components so that the shaft hole shrinks to fit the rotating shaft. Otherwise, these two components cannot be coupled since the shaft hole is too small to accept the rotating shaft.

In the process of mirror finishing of a reflective surface by cutting, the mirror 21 is held by applying holding force (pressing force) to the mirror 21 in two directions (in the vertical direction and the horizontal direction in FIG. 5B).

The bottom surface and the top surface (the both side surfaces disposed in the axial direction of the rotating shaft 22) of the mirror 21 include a process reference surface (to-be-held portion) 56a and a process reference surface (to-be-held portion) 56b, respectively. Each of the process reference surfaces 56a and 56b consists of two arc-shaped projected surfaces formed by two concentric circles having center overlapping the center of the rotating shaft 22. The right and left side surfaces (the surfaces disposed in the direction orthogonal to the axial direction of the rotating shaft 22 and parallel to the axial direction) of the workpiece include a contact surface (to-be-held portion) 56c and a to-be-pressed surface (contact surface, to-be-held portion) 56d, respectively.

Each of the process reference surfaces 56a and 56b consists of two flat-top projections disposed at the same distance from the rotating shaft 22 in the radial direction. When the top and bottom surfaces of the mirror are enough wide as in Comparative Example (FIGS. 9A and 9B) described below, each process reference surface can have a complete ring shape. On the other hand, when the mirror is thin and the top and bottom surfaces of the mirror are narrow as in this example, each process reference surface consists of two arc-shaped surfaces constituting a part of a circle.

To prevent the turning of the workpiece, second holding force is horizontally generated by applying pressure to the contact surface 56c and the opposite to-be-pressed surface (contact surface) 56d, which are parallel to the axial direction of the rotating shaft 22, with a rotation preventing member 63 of the jig 60 and a contact pressing member 64 of the jig, respectively, in addition to the first holding force applied to the process reference surface 56a and the corresponding to-be-pressed surface (process reference surface) which are orthogonal to the reflective surfaces (intersecting with the axis of the rotating shaft 22).

The contact surface 56c is remoter (at a remoter position) from the rotating shaft 22 than the process reference surface 56b is. In the process of finishing by cutting, the process reference surfaces 56a and 56b are vertically pressed with the base 61 and the pressing member 62, respectively, while the contact surface 56c is in contact with the rotation preventing member 63 and is elastically pressed with the contact pressing member 64 from the opposite side.

The pressing member 62 is elastically pressed by an elastic member 62a disposed between the pressing member 62 and an outer frame 66, and the contact pressing member 64 is elastically pressed by an elastic member disposed between the contact pressing member 64 and the outer frame 66.

As described above, the mirror is held by applying pressure to the mirror in two directions (the vertical direction and the horizontal direction). Accordingly, even if the frictional force is small in each contact area, the mirror will not be moved by a cutting tool during cutting. This allows the process of mirror finishing by cutting to be performed directly on a reflective surface of a thin mirror. The contact faces 56c an 56d are remoter from the rotating shaft than the process reference surfaces 56a and 56b are. In other words, the distance from the rotating shaft 22 to the contact surface 56c or 56d is greater than the distance from the rotating shaft 22 to the process reference surface 56a or 56b. Accordingly, even if the pressure applied to the contact surfaces is small, the mirror will not be moved during processing. In addition, since the mirror is flexibly held with the elastic members 62a and 64a, the reflective surfaces will barely be deformed, thereby achieving a high-precision mirror surface.

In other words, although keeping the flatness of a mirror surface and holding the mirror with a great securing force during cutting are generally in the relationship of trade-off, these two objects can be achieved at the same time. The accuracy of finishing can be improved by preventing the movement of the mirror during processing without increasing holding force for pressing the contact surfaces.

The above structure makes it possible to perform the process of mirror finishing by cutting on a reflective surface of a thin mirror composed of a metal material such as an aluminum alloy and having the length twice as long as the length L2 from the center of the rotating shaft to one of the reflective surfaces that is shorter than the length L1 of the reflective surfaces in the direction of the rotating shaft. Using such a thin mirror leads to the reduction in the weight of the rotor and thus the improvement in the durability of the thrust bearing against the vibration and impact from the outside.

The above advantageous actions and effects can also be obtained in the following embodiments.

Figure 6A:
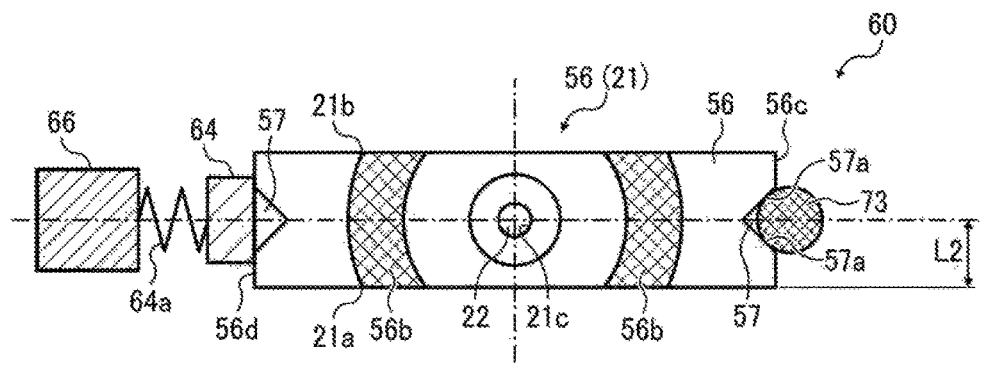
FIG. 6A is a plan view illustrating a part of a jig with a workpiece according to a second embodiment of the present invention.
Figure 6B:
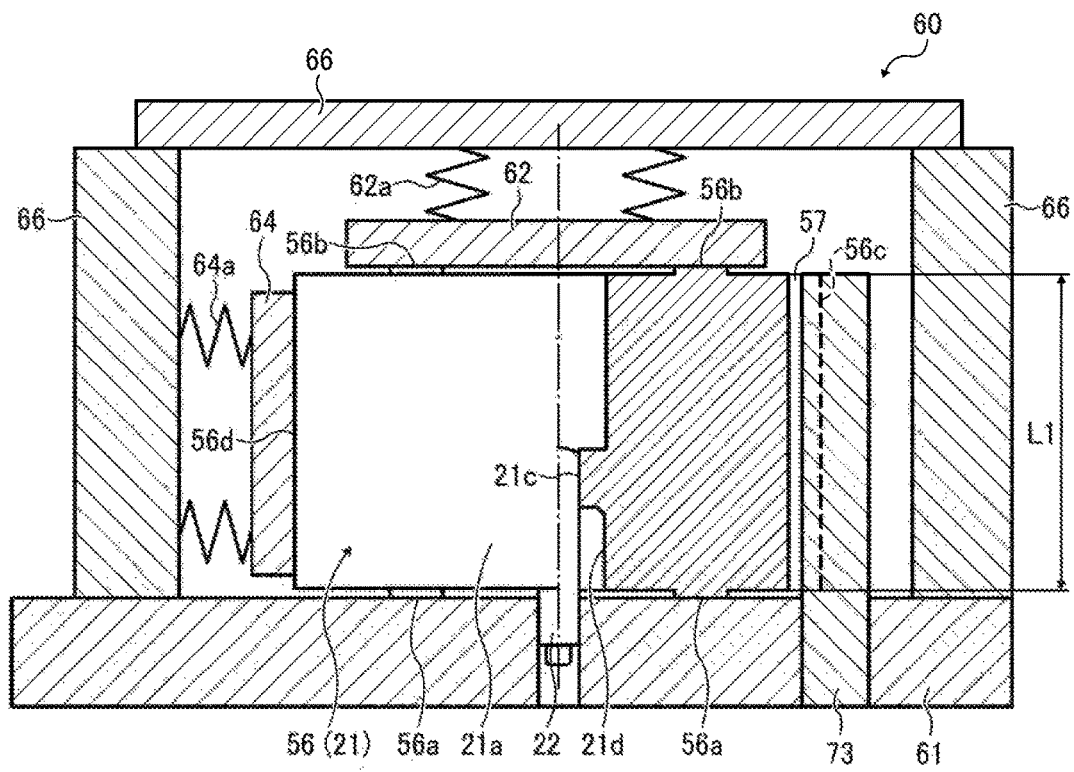
FIG. 6B is a vertical cross-sectional view illustrating the jig holding the workpiece.

FIG. 6A is a plan view illustrating a part of a jig with a workpiece according to a second embodiment of the present invention, and FIG. 6B is a vertical cross-sectional view illustrating the jig holding the workpiece.

The second embodiment is the same as the first embodiment except the structure of the mirror of the optical deflector and the structure of the jig. The differences between the two embodiments will mainly be described below and the same reference numerals will be used for the same elements.

The mirror includes a recess 57 in the contact surface 56c (56d), which is V-shaped in a cross section orthogonal to the rotating shaft 22. The recess 57 further reduces the weight of the thin mirror. In the process of mirror finishing by cutting, a cylindrical rotation preventing member 73 is placed in contact with the V-shaped recess to secure the mirror to the jig 60 for processing.

Referring to FIGS. 6A and 6B, the jig 60 holding the workpiece 56 (the mirror 21) will now be described in detail. FIG. 6B illustrates the jig 60 that has been turned up counterclockwise by 90° from the jig 60 illustrated in FIG. 4B.

The mirror 21 is a thin mirror having the length twice as long as the length L2 from the center of the rotating shaft 22 to one of the reflective surfaces that is shorter than the length L1 of the reflective surfaces in the direction of the rotating shaft 22. The shaft 22 is shrink fitted to the mirror 21 at the horizontal center.

In the process of mirror finishing of a reflective surface by cutting, the mirror 21 is held by applying holding force to the mirror 21 in two directions (the vertical direction and the horizontal direction).

First holding force is vertically generated by applying downward pressure to the top to-be-pressed surface (process reference surface, to-be-held portion) 56b of the mirror 21 with the pressing member 62 of the jig 60 from the top while the bottom process reference surface 56a of the mirror 21 is in contact with the base 61 of the jig 60. In this example, L1 approximately 28 mm and L2 is approximately 6 mm, for example. Accordingly, the mirror has a thin shape. In this example, since L2 is small, the mirror cannot firmly be held only by applying the vertical pressure to the mirror. When a cutting tool comes in contact with the workpiece for mirror finishing by cutting, turning force is applied to the workpiece to move the workpiece from the original position, resulting in failure in processing.

To prevent the turning of the workpiece in this embodiment, second holding force is horizontally generated by applying pressure to the contact surface (to-be-held portion) 56c and the opposite to-be-pressed surface (contact surface, to-be-held portion) 56d, which are parallel to the axial direction of the rotating shaft, with a rotation preventing member 73 and contact pressing member 64, respectively, in addition to the first holding force applied to the process reference surfaces (to-be-held portions) 56a and 56b, which are orthogonal to the reflective surfaces. The contact surface 56c is remoter from the rotating shaft 22 than the process reference surface 56b is. In the process of mirror finishing by cutting, the process reference surfaces 56a and 56b are vertically pressed by the jig while the contact surface 56c is in contact with the rotation preventing member 73 and is elastically pressed with the contact pressing member 64 from the opposite side.

In this embodiment, the V-shaped recess 57 is formed in at least one of the contact surfaces. In this example, the recess 57 is formed in each of the contact surface 56c and the to-be-pressed surface 56d, and the rotation preventing member 73 is placed in contact with the inside wall (contact surface) 57a of the recess 57 to generate a strong horizontal holding force (a securing force for the mirror). The inside wall 57a consists of two walls parallel to the axial direction of the rotating shaft 22, not orthogonal to the reflective surfaces, and intersecting with the reflective surfaces at a predetermined angle.

The contact surface may be flat as in the first embodiment or include a polyhedral inside wall including a plurality of intersecting planes as in this example.

As described above, the mirror is held by applying pressure to the mirror in two directions. Accordingly, even if the frictional force is small in each contact area, the mirror will not be moved by a cutting tool during cutting. This allows the process of mirror finishing by cutting to be performed directly on a reflective surface of a thin mirror. The contact surfaces are remoter from the rotating shaft than the process reference surfaces are. Accordingly, even if the pressure applied to the contact surfaces is small, the mirror will not be moved during processing. In addition, since the mirror is flexibly held, the reflective surfaces will barely be deformed, thereby achieving a high-precision mirror surface.

The above structure makes it possible to perform the process of mirror finishing by cutting on a reflective surface of a thin mirror composed of a metal material such as an aluminum alloy and having the length twice as long as the length L2 from the center of the rotating shaft to one of the reflective surfaces that is shorter than the length L1 of the reflective surfaces in the direction of the rotating shaft. Using such a thin mirror leads to reduction in the weight of the rotor and thus the improvement in the durability of the thrust bearing against the vibration and impact from the outside.

Figure 7A:
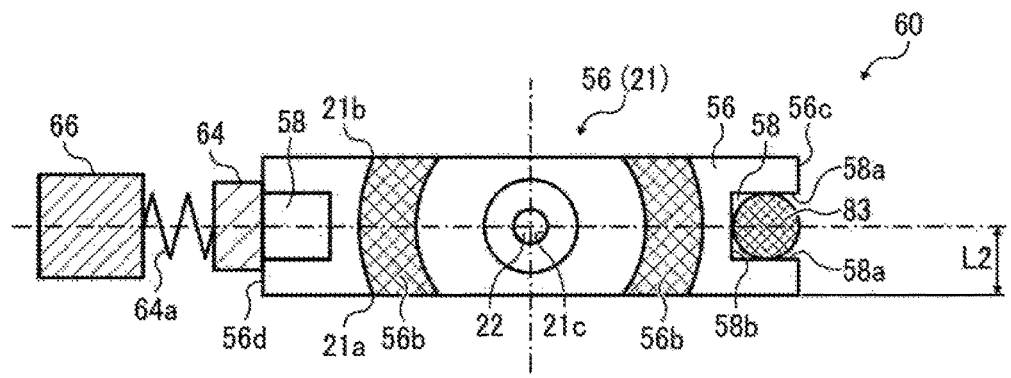
FIG. 7A is a plan view illustrating a part of a jig with a workpiece according to a third embodiment of the present invention.
Figure 7B:
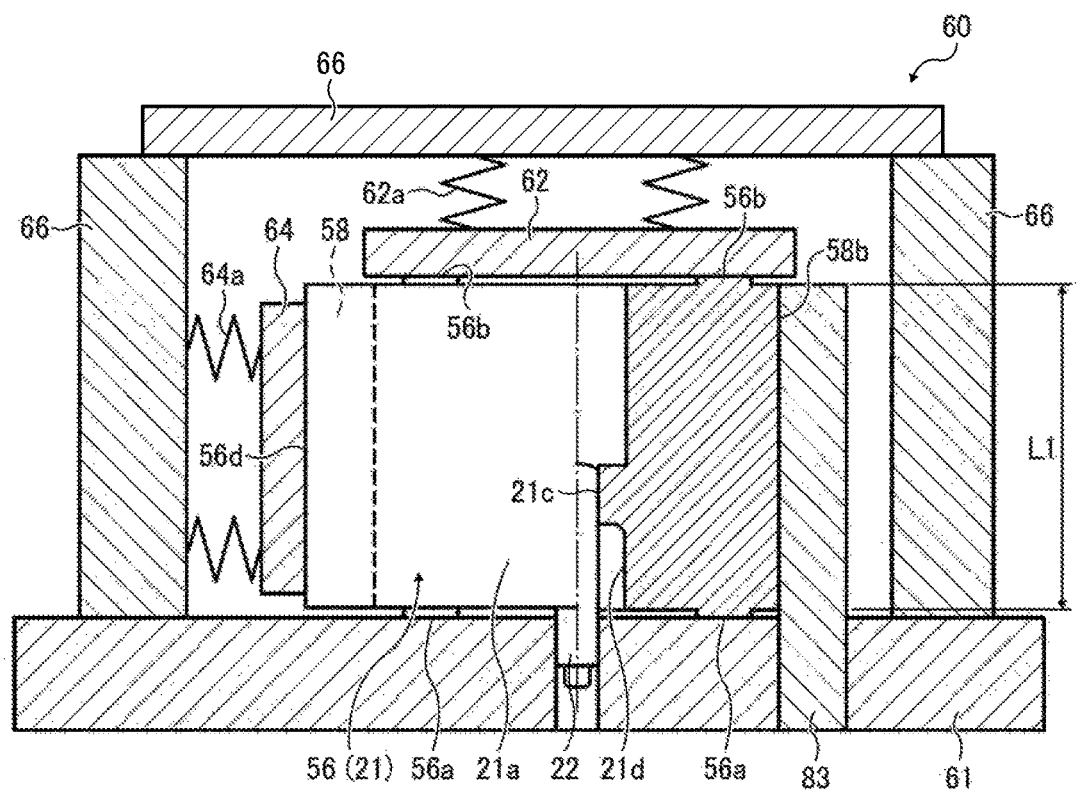
FIG. 7B is a vertical cross-sectional view illustrating the jig holding the workpiece.

FIG. 7A is a plan view illustrating a part of a jig with a workpiece according to a third embodiment of the present invention, and FIG. 7B is a vertical cross-sectional view illustrating the jig holding the workpiece.

The third embodiment is the same as the first embodiment except the structure of the mirror of the optical deflector and the structure of the jig. The description of the same elements will be emitted.

The mirror includes a recess 58 in the contact surface (to-be-held portion) 56c (56d), which is rectangular (U-shaped) in a cross section orthogonal to the rotating shaft 22. The recess 58 further reduces the weight of the thin mirror. In the process of mirror finishing by cutting, a cylindrical rotation preventing member 83 is placed in contact with the recess 58 to secure the mirror to the jig 60 for processing.

Referring to FIGS. 7A and 7B, the jig 60 holding the workpiece 56 (the mirror 21) will now be described in detail. FIG. 7B illustrates the jig 60 that has been turned up counterclockwise by 90° from the jig 60 illustrated in FIG. 4B.

The workpiece 56 (the mirror 21) is a thin mirror having the length twice as long as the length L2 from the center of the rotating shaft to one of the reflective surfaces that is shorter than the length L1 of the reflective surfaces in the direction of the rotating shaft shaft 22 is shrink fitted to the mirror 21.

In the process of mirror finishing of a reflective surface by cutting, the mirror 21 is held by applying holding force to the mirror 21 in two directions.

First holding force is vertically generated by applying downward pressure to the to-be-pressed surface (process reference surface, to-be-held portion) 56b of the mirror 21 with the pressing member 62 from the top while the process reference surface (to-be-held portion) 56a of the mirror 21 is in contact with the base 61 of the jig 60. In this example, L1 is approximately 28 mm and L2 is approximately 6 mm, for example. Accordingly, the mirror has a thin shape. In this example, since L2 is small, the mirror cannot firmly be held only by applying the vertical pressure to the mirror. When a cutting tool comes in contact with the mirror for mirror finishing by cutting, turning force is applied to the mirror to move the mirror from the original position, resulting in failure in processing.

To prevent the turning of the mirror, second holding force is horizontally generated by applying pressure to the contact surface 56c and the opposite to-be-pressed surface (contact surface) 56d, which are parallel to the axial direction of the rotating shaft, with a cylindrical rotation preventing member 83 and the contact pressing member 64, respectively, in addition to the first holding force applied to the process reference surface 56a and the corresponding to-be-pressed surface 56b, which are orthogonal to the reflective surfaces.

In this embodiment, the rectangular (U-shaped) recess 58 is formed in each of the contact surface 56*c* and the to-be-pressed surface (contact surface) 56*d*, and the rotation preventing member 83 is placed in contact with inside walls 58*a* and 58*b* of the recess 58 to generate a strong horizontal holding force (a securing force for the mirror).

The rotation preventing member 83 is not necessarily cylindrical. The rotation preventing member 83 may be a polygonal column or have any other shape as long as the rotation preventing member 83 can press the inside wall of the recess, especially the inside wall 58*b* closer to the rotating shaft, toward the rotating shaft.

The inside wall (contact surface) 58*b* extends in the direction parallel to the rotating shaft 22 and is orthogonal to the reflective surfaces.

The contact surface may be flat as in the first embodiment. When the flat contact surface has a recess in a part of its area or in the entire area and the inside surface of the recess is the polyhedral inside wall including a plurality of intersecting planes, one of the planes may function as a contact surface (the surface to be in contact with the rotation preventing member) as in this example. Alternatively, the contact surface may be the inside wall of a curved recess.

The inside wall (contact surface) 58*b* of the recess 58, which is closer to the rotating shaft, is remoter from the rotating shaft 22 than the process reference surfaces 56*a* and 56*b* are. In the process of mirror finishing by cutting, the process reference surfaces are vertically pressed by the jig while the contact surface 58*b* is in contact with the rotation preventing member 83 and is elastically pressed with the contact pressing member 64 from the opposite side.

As described above, the mirror is held by applying pressure to the mirror in two directions (the vertical direction and the horizontal direction). Accordingly, even if the frictional force is small in each contact area, the mirror will not be moved by a cutting tool during cutting. This allows the process of mirror finishing by cutting to be performed directly on a reflective surface of a thin mirror. The contact surfaces are remoter from the rotating shaft than the process reference surfaces are. Accordingly, even if the pressure applied to the contact surfaces is small, the mirror will not be moved during processing. In addition, since the mirror is flexibly held, the reflective surfaces will barely be deformed, thereby achieving a high-precision mirror surface.

The above structure makes it possible to perform the process of mirror finishing by cutting on a reflective surface of a thin mirror composed of a metal material such as an aluminum alloy and having the length twice as long as the length L2 from the center of the rotating shaft to one of the reflective surfaces that is shorter than the length L1 of the reflective surfaces in the direction of the rotating shaft. Using such a thin mirror leads to the reduction in the weight of the motor and thus the improvement in the durability of the thrust bearing against the vibration and impact from the outside.

Figure 8A:
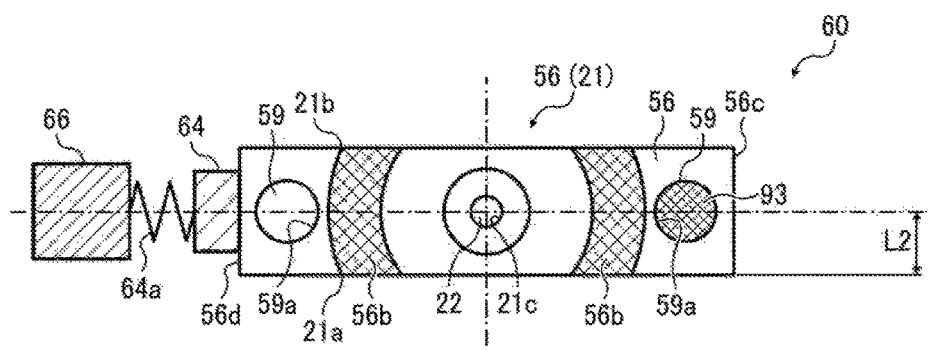
FIG. 8A is a plan view illustrating a part of a jig with a workpiece according to a fourth embodiment of the present invention.
Figure 8B:
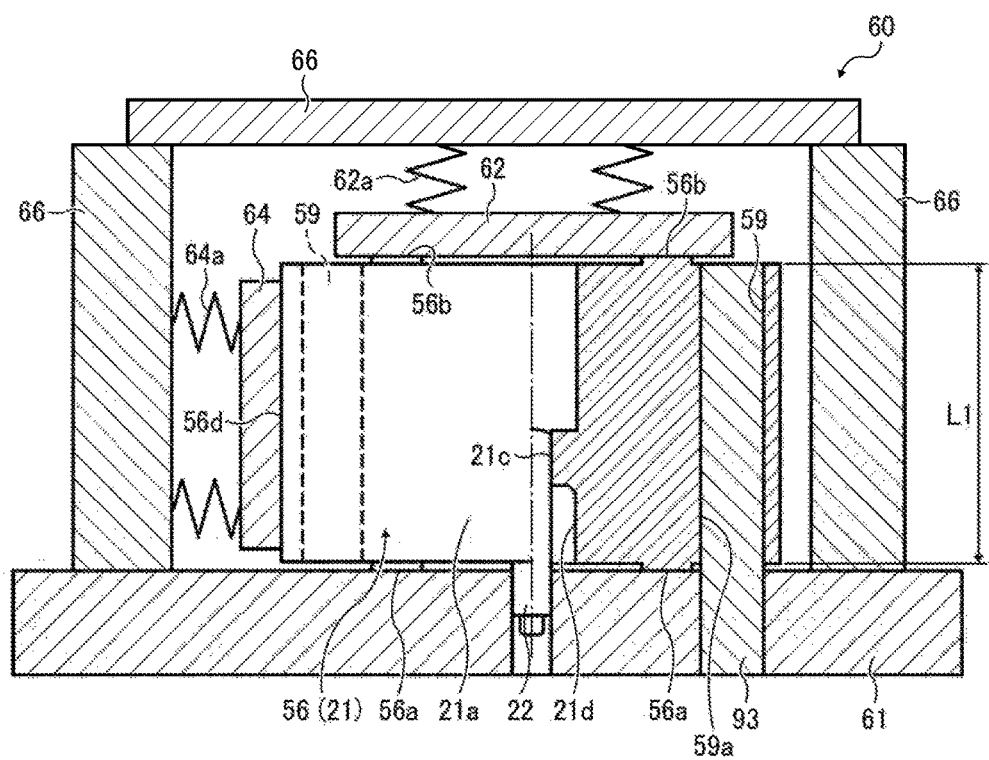
FIG. 8B is a vertical cross-sectional view illustrating the jig holding the workpiece.

FIG. 8A is a plan view illustrating a part of a jig with a workpiece according to a fourth embodiment of the present invention, and FIG. 8B is a vertical cross-sectional view illustrating the jig holding the work piece.

The fourth embodiment is the same as the first embodiment except the structure. Of the mirror of the deflector and the structure of the jig. The description of the same elements will be emitted.

The mirror includes a through-hole 59 in the mirror at a site close to the contact surface (to-be-held portion) 56*c* (56*d*) in a cross section orthogonal to the rotating shaft. The through-hole 59 further reduces the weight of the thin mirror. In the process of mirror finishing by cutting, a cylindrical rotation preventing member 93 is placed (engaged) in the through-hole 59 to secure the mirror to the jig 60 for processing.

The contact surface parallel to the axial direction of the rotating shaft is thus an inside wall 59*a* of the cylindrical through-hole 59. In the process of mirror finishing by cutting, the cylindrical rotation preventing member 93 is inserted in the through-hole 59 to secure the mirror to the jig 60, the structure resulting in the reduction in the weight of the rotor.

The mirror 21 is a thin mirror having the length twice as long as the length L2 from the center of the rotating shaft to one of the reflective surfaces that is shorter than the length L1 of the reflective surfaces in the direction of the rotating shaft. The shaft 22 is shrink fitted to the mirror 21.

In the process of mirror finishing of a reflective surface by cutting, the mirror 21 is held by applying holding force to the mirror 21 in two directions.

First holding force is vertically generated by applying downward pressure to the to-be-pressed surface (process reference surface, to-be-held portion) 56*b* of the mirror 21 with the pressing member 62 from the top while the process reference surface 56*a* of the mirror 21 is in contact with the base 61 of the jig 60. In this example, L1 is approximately 28 mm and L2 is approximately 6 mm, for example. Accordingly, the mirror has a thin shape. In this example, since L2 is small, the mirror cannot firmly be held only by applying the vertical pressure to the mirror. When a cutting tool comes in contact with the mirror for mirror finishing by cutting, turning force is applied to the mirror to move the mirror from the original position, resulting in failure in processing.

To prevent the turning of the mirror, second holding force is horizontally generated by applying pressure to the contact surface 59*a* and the opposite to-be-pressed surface (contact surface) 56*d*, which are parallel to the axial direction of the rotating shaft, with the rotation preventing member 93 and the contact pressing member 64, respectively, in addition to the first holding force applied to the process reference surface 56*a* and the corresponding to-be-pressed surface 56*b*, which are orthogonal to the reflective surfaces.

The contact surface 59*a* is remoter from the rotating shaft 22 than the process reference surfaces 56*a* and 56*b* are, in the process of mirror finishing by cutting, the process reference surfaces 56*a* and 56*b* are vertically pressed by the jig while the contact surface 59*a* is in contact with the rotation preventing member 93 and is elastically pressed with the contact pressing member 64 from the opposite side.

In this example, the contact surface 59*a* is the inside wall of the through-hole 59 and the area of the inside wall closer to the rotating shaft 22 effectively functions as the contact surface 59*a*.

The curved contact surface 59*a* extends in the direction parallel to the rotating shaft 22 and is not orthogonal to the reflective surfaces, but meets the reflective surfaces at a predetermined angle.

The through-hole 59 is not necessarily cylindrical. The through-hole 59 may be in the form of an elliptic, oblong, triangular, rectangular, or any other polygonal column. When the through-hole is in the form of an elliptic, oblong, or polygonal column, the rotation preventing member 93 to be inserted in this through-hole should preferably have a similar column shape to the through-hole. Such a rotation preventing member 93 can press the contact surface 59*a* while being in contact with the contact surface 59*a* in the entire area. The cylindrical through-hole 59 in the mirror reduces the weight of the mirror. The cylindrical inside wall of the through-hole 59 can be made with high precision.

As described above, the mirror is held by applying pressure to the mirror in two directions. Accordingly, even if the frictional force is small in each contact area, the mirror will not be moved by a cutting tool during cutting. This allows the process of mirror finishing by cutting to be performed directly on a reflective surface of a thin mirror. The contact surfaces are remoter from the rotating shaft than the process reference surfaces are. Accordingly, even if the pressure applied to the contact surfaces is small, the mirror will not be moved during processing. In addition, since the mirror is flexibly held, the reflective surfaces will barely be deformed, thereby achieving a high-precision mirror surface.

The above structure makes it possible to perform the process of mirror finishing by cutting on a reflective surface of a thin mirror composed of a metal material such as an aluminum alloy and having the length twice as long as the length L2 from the center of the rotating shaft to one of the reflective surfaces that is shorter than the length L1 of the reflective surfaces in the direction of the rotating shaft. Using such a thin mirror leads to the reduction in the weight of the rotor and thus the improvement in the durability of the thrust bearing against the vibration and impact from the outside.

In the above embodiments, the mirror has two sides, i.e. two opposite reflective surfaces as an example, however, the mirror may have only one reflective surface, or three or more reflective surfaces.

Figure 9A:
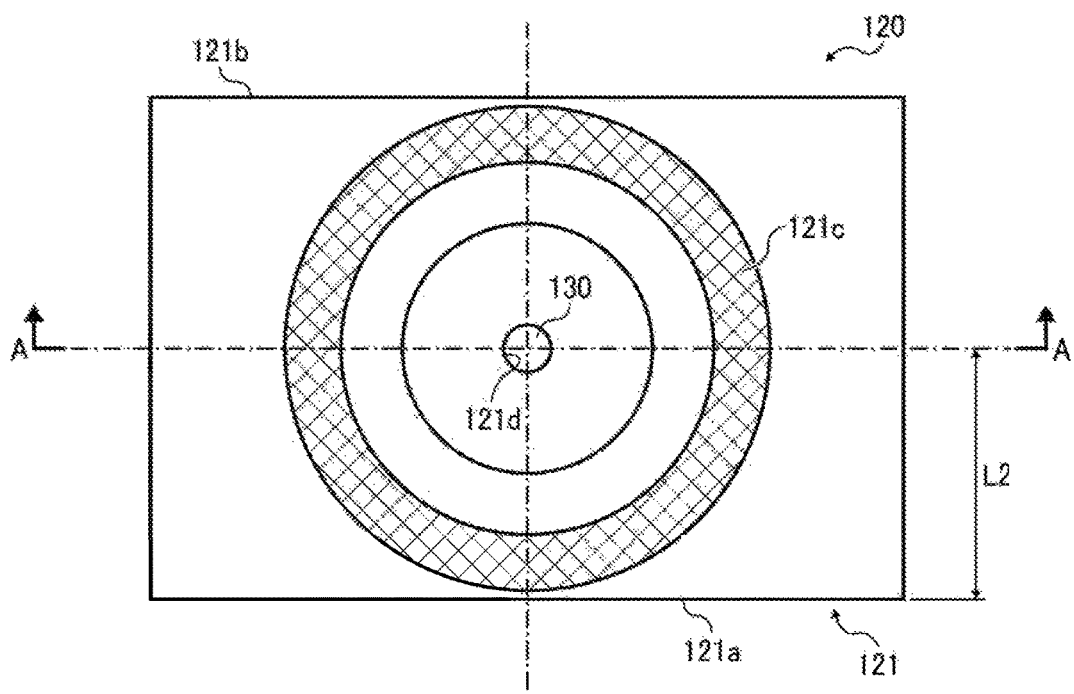
FIG. 9A is a plan view illustrating a mirror having the length (the thickness) twice as long as the length from the rotational central axis to one of the reflective surfaces that is longer than the length of the reflective surfaces in the direction of the rotating shaft.
Figure 9B:
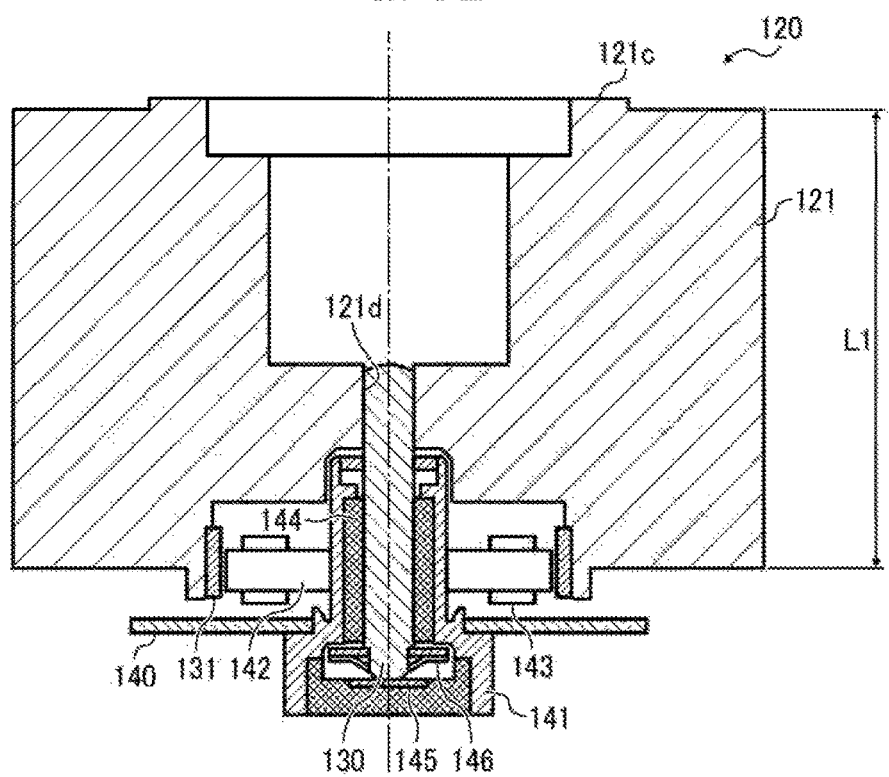
FIG. 9B is a cross-sectional view taken along line A-A of FIG. 9A, according to a Comparative Example.

Referring to FIGS. 9A and 9B, the optical deflector 120 of Comparative Example will now be described.

FIG. 9A is a plan view illustrating a mirror (Comparative Example) having the length (the thickness) twice as the length from the rotational central axis to one of the reflective surfaces that is longer than the length of the reflective surfaces in the direction of the rotating shaft, and FIG. 9B is a cross-sectional view taken along line A-A of FIG. 9A.

The optical deflector 120 of Comparative Example includes a reflector (mirror) 121 having two opposite mirror surfaces 121a and 121b and a process reference surface 121c, a rotating shaft 130 secured to the reflector in a central hole 121d of the reflector, rotor magnets 131 secured to an inside wall of a lower recess in the reflector, a stator core 142 supported by a housing 141 secured to a circuit board 140, wire-wound coils 143, a bearing 144 supported by the housing and rotatably supporting a part of the rotating shaft 130, a thrust bearing 145 supporting the tip of the rotating shaft 130, and a stopper 146. The rotor magnets 131, the stator core 142, and the wire-wound coils 143 constitute a motor.

As illustrated in FIG. 9A, the process reference surface 121c in this structure is a large ring-shaped surface, which is to be pressed for preventing the turning of the reflector 121 during the cutting of the mirror surfaces 121a and 121b with a cutting tool. Such a reflector having the long length of the reflective surfaces in the direction of the rotating shaft inevitably leads to the increase in the mass of the rotor magnet 131. When the rotor magnet vibrates due to the vibration from the outside, the impact is repeatedly applied to the thrust bearing 145. Such an impact increases with the increase in the mass of the rotor magnet, adversely affecting the durability and reliability of the thrust bearing 145.

In this Comparative Example, the axial length L1 of the reflective surfaces is 21 mm the length L2 from the center of the rotating shaft to one of the reflective surfaces is 16 mm, and the length twice as long as the length L2 is 32 mm.

Therefore, the motor including the rotor magnets 131 should be disposed in the lower recess in the mirror 121.

To downsize (thin) the reflector to solve the above disadvantage, it has been proposed to prepare a thin reflector with two parallel and opposite reflective surfaces that has the length twice as long as the length from the center of the rotating shaft to one of the reflective surfaces that is shorter than the length of the reflective surfaces in the direction of the rotating shaft. In this case, however, since such a thin reflector has only a narrow process reference surface orthogonal to the reflective surfaces, holding force cannot be applied enough to the narrow process reference surface for holding the thin reflector on the top, bottom, right, and left surfaces by a jig during mirror finishing of the reflective surfaces by cutting with a cutting tool. As a result, the reflector is turned during processing, making it difficult to perform a high-precision mirror finishing by cutting for obtaining a thin mirror for an optical deflector.

By adopting the structures for holding a mirror according to the above embodiments of the present invention the length L2 can be shortened to approximately ½ to ⅓ compared to Comparative Example in FIGS. 9A and 9B, leading to the reduction in the mass of the mirror to approximately ½ to ⅓ and thus the reduction the mass of the rotor. As a result, the impact repeatedly applied to the thrust bearing when the rotor vibrates due to the vibration from the outside is decreased, improving the durability and reliability of the thrust bearing.

In the embodiments of the present invention, since the length L2 is approximately ½ to ⅓ compared to Comparative Example in FIGS. 9A and 9B, the deflectors of these embodiments have the following optical advantage.

The rotation of the mirror 21 causes the reflected optical beams to scan an image height. With the decrease in the radius of the inscribed circle of the mirror, the difference (sag) between the irradiation sites (reflecting points) of the optical beams in the mirror at this image height decreases. With the decrease in the sag, the eclipse of the optical beams on the rotating mirror decreases especially when the optical beams scan in a wide range of angle of field, allowing effective irradiation of a detection area with the optical beams and receipt of the optical beams reflected back from the detection area.

Figure 10:
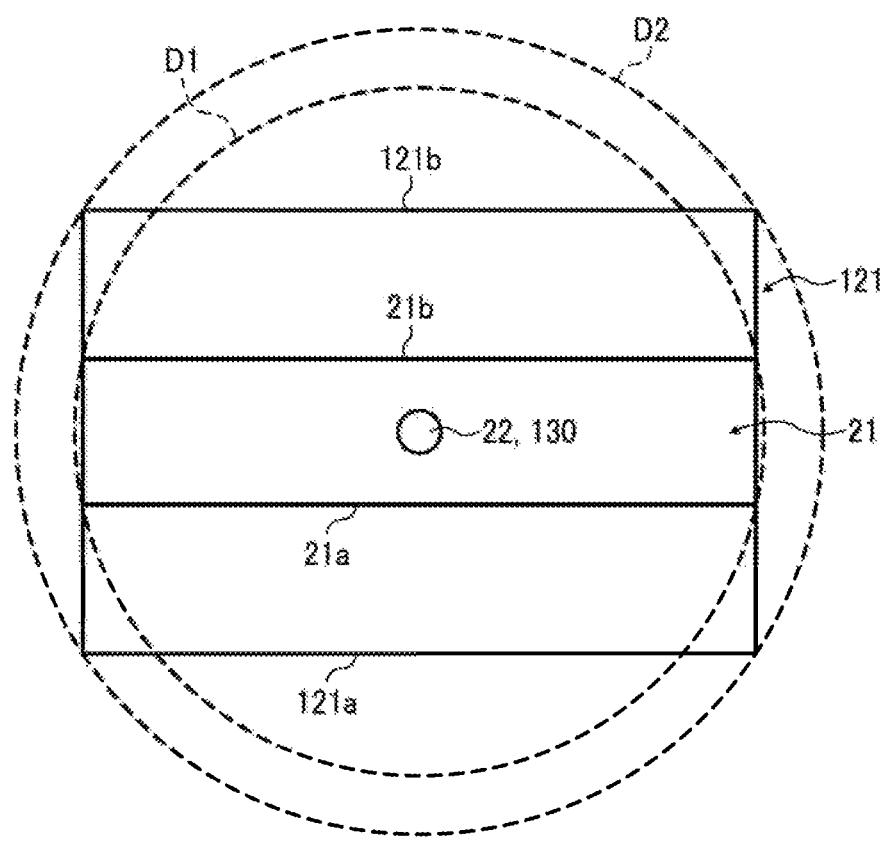
FIG. 10 is a view illustrating the comparison between the diameters of the circumcircles of the mirrors in a plane orthogonal to the rotating shafts of the optical deflectors, between the embodiment and the Comparative Example.

FIG. 10 is a view illustrating the comparison between the diameters of the circumcircles of the mirrors in a plane orthogonal to the rotating shafts of the optical deflectors. As is obvious from FIG. 10, the outer circumcircle D1 of the mirror of an embodiment of the present invention has a smaller diameter than the outer circumcircle D2 of the mirror of Comparative Example does. Accordingly, the mirror of the embodiment of the present invention is smaller than that of Comparative Example.

Figure 11:
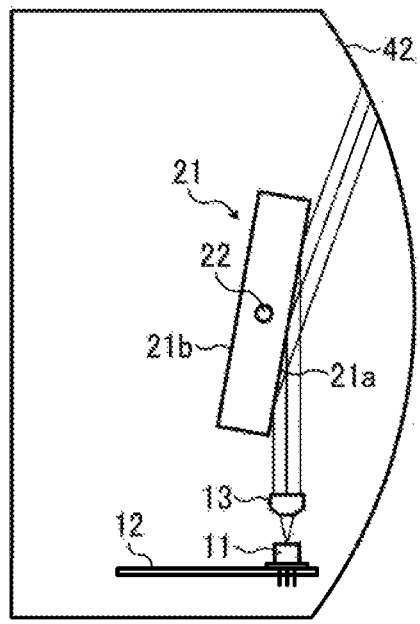
FIG. 11 are schematic views illustrating the comparison of the LiDAR device including the mirror according to the embodiment of the present invention with the LiDAR device including a conventional mirror.
Figure 11:
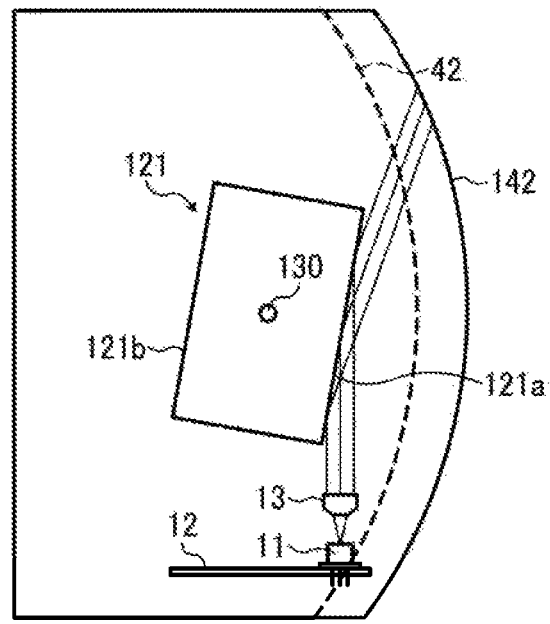
Figure 11:
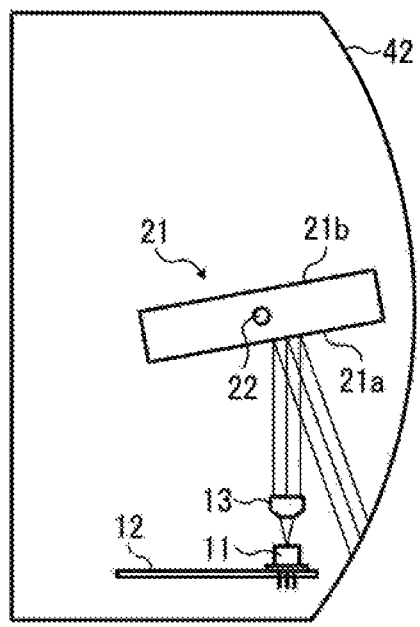
Figure 11:
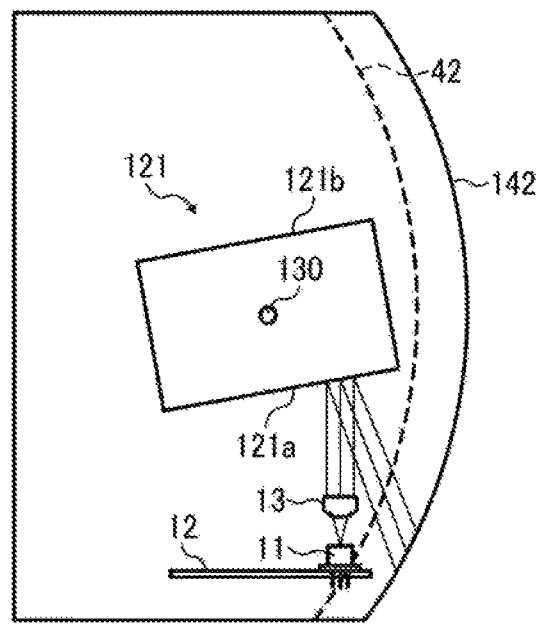

FIG. 11 are schematic views illustrating the comparison of the LiDAR device including the mirror according to an embodiment of the present invention with the LiDAR device including a conventional mirror. In FIG. 11, (a-1) and (a-2) illustrate the mirror of the embodiment of the present invention and (b-1) and (b-2) illustrate the conventional mirror. In Comparative Example illustrated in (b-1) and (b-2), a cover 142 is projected outward due to the large diameter of the circumcircle of the mirror 121, making it difficult to achieve a compact layout of the light source device. On the other hand, in the LiDAR device of the embodiment of the present invention having a smaller diameter of the circumcircle of the mirror illustrated in (a-1) and (a-2), the cover 42 can be disposed at a site inner than that of the cover 142 due to a substantially smaller diameter of the circumcircle of the mirror 21. Accordingly, the LiDAR device of the embodiment of the present invention is obviously smaller than that of Comparative Example.

As described above, the optical deflector according to an embodiment of the present invention includes the rotatable mirror 21 having a reflective surface parallel to the axial direction of the rotating shaft 22. The mirror 21 is made of a metal member having a reflective surface formed by mirror finishing by cutting. In the mirror 21, the length twice as long as length from the center of the rotating shaft to the reflective surface (the diameter of the inscribed circle) is shorter than the length of the reflective surface in the direction of the rotating shaft.

Using the mirror 21, which is thin in the direction of the diameter at the inscribed circle, decreases the weight of the rotor magnets for the mirror, improving the durability of the thrust bearing 26 against the vibration and impact from the outside. Accordingly, when the optical deflector with this mirror is mounted in a vehicle, for example, the thrust bearing will not be damaged by the vibration repeatedly given to the optical deflector.

In this disclosure, it is assumed that, being parallel to the axial direction of the rotating shaft, is substantially the same as, not to be orthogonal to or intersecting with the axial direction of the rotating shaft.

Further, the metal member is a single member composed of a metal material, for example.

In the optical deflector according to an embodiment of the present invention, the rotating shaft 22 is integrated with the mirror 21 by shrink fitting.

Since the rotating shaft is integrated with the mirror in the shaft hole 21c by shrink fitting, the mirror is firmly secured in the optical deflector, allowing the optical deflector to endure the vibration and impact from the outside when mounted in a vehicle, for example.

In the optical deflector according to an embodiment of the present invention, the mirror 21 includes the reference surfaces 56a and 56b orthogonal to the reflective surfaces, the contact surface 56c, 57a, 58b, or 59a parallel to the rotating shaft. The reference surfaces 56a and 56b, or the contact surface 56c, 57a, 58b, or 59b, each of which are integral with the mirror, are used for preventing the turning of the mirror around the rotating shaft. More specifically, members of the jig 60 as a holding device (the base 61, the pressing member 62, the contact pressing member 64, and, the rotation preventing member 63, 73, 83 or 93) are made in contact with the reference surfaces 56a and 56b, and the contact surface 56c, 57a, 58b, or 59a, to apply force in vertical and horizontal directions.

Each of the reference surfaces consists of two projections disposed at the same distance from the rotating shaft in the radial direction (like two arcs formed by two concentric circles). In this embodiment, the flat areas around the reference surfaces are not in contact with the base 61 and the pressing member 62.

Aside from the reference surfaces orthogonal to the rotating shaft, the contact surfaces are provided to hold the mirror in the process of mirror finishing of a thin mirror by cutting. This embodiment achieves the optical deflector including the mirror that has a base material composed of a metal material such as an aluminum alloy and is thin in the direction of the rotation radius. Since the jig can easily access the mirror from the outside, a large holding throe can be applied to the mirror so that the mirror is not moved by the force applied during the process of mirror finishing by cutting.

In the optical deflector according to an embodiment of the present invention, a distance between the contact surface (to-be-held portion) 56c, 57a, 58b, or 59a and the rotating shaft is made larger than a distance between the reference surfaces and the rotating shaft.

With this structure, the mirror can be held with a small holding force without being turned by the moment applied during the process of mirror finishing by cutting. This achieves a high-precision reflective surface that has barely been deformed before the removal of the holding force.

In the optical deflector according to an embodiment of the present invention, the contact surface may be provided with a recess, which forms a polyhedral inside wall including a plurality of intersecting planes.

In another embodiment, the contact surface may be provided with a through-hole, forming a curved inside wall. The cylindrical through-hole 59 in the mirror reduces the weight of the mirror. The cylindrical inside wall can be made with high precision.

In the method for mirror finishing of a mirror by cutting according to an embodiment of the present invention, the mirror of the above optical deflector is held, while the reference surfaces and the contact surfaces are being pressed against the members of the jig 60 (the base 61, the pressing member 62, the contact pressing member 64, and the rotation preventing member 63, 73, 83, or 93).

This method allows a high-precision process of mirror finishing by cutting of a thin mirror having a large area in the direction of the rotating shaft, which cannot be performed by a conventional holding method that holds the mirror only in the vertical direction.

In another embodiment, the LiDAR device is provided, which includes the above optical deflector.

Using the mirror that is thin in the direction of the rotation radius reduces the weight of the rotor secured to the mirror, improving the durability of the thrust bearing against the vibration and impact from the outside.

When mirror finishing by cutting of the reflector that is to be attached to the optical deflector of the LiDAR device and has a thin structure in which the length twice as long as the length from the center of the rotating shaft to one of two parallel and opposite reflective surfaces is shorter than the length of the reflective surfaces in the direction of the rotating shaft, the mirror is held on four to-be-held portions on the respective edge surfaces between the two reflective surfaces. The four to-be-held portions are two to-be-held portions orthogonal to the rotating shaft and two to-be-held portions parallel to the rotating shaft and communicating, to the reflective surfaces (not only at a right angle but also at another angle). This allows a high-precision mirror finishing by cutting to be performed on a metal member with a thin structure, reducing the mass of the rotor and improving the durability of the LiDAR device including the optical deflector against the vibration/impact.

The short length from the center of the rotating shaft to one of the reflective surfaces allows the scanning in a wide range of angle and is optically advantageous.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An optical deflector, comprising:
   a rotatable shaft;

a mirror rotatable around the rotatable shaft of the optical deflector, the mirror including a base made of metal and a reflective surface, the reflective surface being parallel to an axial direction of the rotatable shaft of the mirror; and a motor to rotate the rotatable shaft and the mirror through at least a complete revolution, wherein a length that is twice a length of the mirror from a center of the rotatable shaft to the reflective surface is shorter than a length of the reflective surface in the direction of the rotatable shaft.

2. The optical deflector according to claim 1, wherein the rotatable shaft is a separate element from the mirror and integrated with the mirror by shrink fitting.

3. The optical deflector according to claim 2, wherein the mirror further includes:

a reference surface orthogonal to the reflective surface; and a contact surface parallel to the rotatable shaft of the mirror, the reference surface and the contact surface being integral with the mirror, wherein, while the mirror is being held by a holding device for processing, the reference surface and the contact surface are pressed against a first member and a second member of the holding device, respectively, to secure a position of the mirror in vertical and horizontal directions.

4. The optical deflector according to claim 3, wherein a distance from the rotatable shaft to the contact surface is larger than a distance from the rotatable shaft to the reference surface.

5. The optical deflector according to claim 3, wherein the contact surface includes a recess forming an inside wall on the contact surface, the inside wall being a polyhedral inside wall including a plurality of intersecting planes.

6. The optical deflector according to claim 3, wherein the contact surface includes a through-hole forming a curved inside wall on the contact surface.

7. A light detection and ranging (LiDAR) device comprising the optical deflector according to claim 1.

8. A method for mirror finishing by cutting of a mirror for an optical deflector which includes the mirror which is rotatable around a rotatable shaft of the optical deflector, the mirror including a base made of metal and a reflective surface, the reflective surface being parallel to an axial direction of the rotatable shaft of the mirror, wherein a length that is twice a length of the mirror from a center of the rotatable shaft to the reflective surface is shorter than a length of the reflective surface in the direction of the rotatable shaft, wherein the mirror further includes a reference surface orthogonal to the reflective surface; and a contact surface parallel to the rotatable shaft of the mirror, the reference surface and the contact surface being integral with the mirror, wherein, while the mirror is being held by a holding device for processing, the reference surface and the contact surface are pressed against a first member and a second member of the holding device, respectively, to secure a position of the mirror in vertical and horizontal directions, the method comprising:

applying mirror finishing by cutting on the reflective surface of the mirror, while holding the mirror with the first member and second member, the first member and the second member respectively being pressed against the reference surface and the contact surface.

9. An optical deflector, comprising:

a mirror rotatable around a rotating shaft of the optical deflector, the mirror including a base made of metal and a reflective surface, the reflective surface being parallel to an axial direction of the rotating shaft of the mirror, wherein a length that is twice a length of the mirror from a center of the rotating shaft to the reflective surface is shorter than a length of the reflective surface in the direction of the rotating shaft, wherein the rotatable shaft is a separate element from the mirror and integrated with the mirror by shrink fitting, wherein the mirror further includes:

a reference surface orthogonal to the reflective surface; and a contact surface parallel to the rotating shaft of the mirror, the reference surface and the contact surface being integral with the mirror, wherein, while the mirror is being held by a holding device for processing, the reference surface and the contact surface are pressed against a first member and a second member of the holding device, respectively, to secure a position of the mirror in vertical and horizontal directions, wherein the contact surface includes a recess forming an inside wall on the contact surface, the inside wall being a polyhedral inside wall including a plurality of intersecting planes.

* * * * *